(12) United States Patent
Chen et al.

(10) Patent No.: US 10,895,642 B2
(45) Date of Patent: Jan. 19, 2021

(54) DISTANCE MEASURING DEVICE

(71) Applicant: TDK TAIWAN CORP., Taoyuan (TW)

(72) Inventors: Shu-Shan Chen, Taoyuan (TW);
Chao-Chang Hu, Taoyuan (TW);
Chih-Wei Weng, Taoyuan (TW);
Sin-Jhong Song, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 163 days.

(21) Appl. No.: 16/164,193

(22) Filed: Oct. 18, 2018

(65) Prior Publication Data

US 2019/0113621 A1 Apr. 18, 2019

Related U.S. Application Data

(60) Provisional application No. 62/621,967, filed on Jan. 25, 2018, provisional application No. 62/573,918, filed on Oct. 18, 2017.

(30) Foreign Application Priority Data

Oct. 12, 2018 (CN) .......................... 2018 1 1191146

(51) Int. Cl.
| | |
|---|---|
| *G06K 7/10* | (2006.01) |
| *G01S 17/86* | (2020.01) |
| *G01S 17/48* | (2006.01) |
| *G01S 17/89* | (2020.01) |
| *H04N 13/15* | (2018.01) |
| *H04N 9/04* | (2006.01) |
| *H04N 13/156* | (2018.01) |
| *G01S 7/481* | (2006.01) |
| *G01B 11/25* | (2006.01) |

(52) U.S. Cl.
CPC .......... *G01S 17/86* (2020.01); *G01B 11/2513* (2013.01); *G01S 7/4814* (2013.01); *G01S 7/4815* (2013.01); *G01S 17/48* (2013.01); *G01S 17/89* (2013.01); *H04N 9/0451* (2018.08); *H04N 13/15* (2018.05); *H04N 13/156* (2018.05)

(58) Field of Classification Search
CPC ...... G01S 17/86; G01S 7/4814; G01S 7/4815; G01S 17/48; G01S 17/89; H04N 13/15; H04N 13/156; H04N 9/0451; G01B 11/2513
USPC ......................................................... 235/454
See application file for complete search history.

(56) References Cited

U.S. PATENT DOCUMENTS

| | | | | |
|---|---|---|---|---|
| 5,475,456 A | * | 12/1995 | Haraguchi | G02B 7/102 396/349 |
| 2014/0071431 A1 | * | 3/2014 | Last | G01S 17/89 356/4.03 |
| 2018/0059248 A1 | * | 3/2018 | O'Keeffe | G01S 7/003 |

* cited by examiner

*Primary Examiner* — Karl D Frech
(74) *Attorney, Agent, or Firm* — Muncy, Geissler, Olds & Lowe, PC

(57) ABSTRACT

A distance measuring device for measuring the distance to an object is provided, including a light-emitting module, a driving assembly disposed in the light-emitting module, and a light-receiving module. The light-emitting module has a housing, a light source disposed in the housing, a light grating element, and an optical path adjuster. The light source emits a measuring light sequentially through the optical path adjuster and the light grating element along a first axis. The driving assembly can drive the optical path adjuster or the light grating element to move relative to the housing. The light-receiving module receives the measuring light which is reflected by the object to obtain distance information of the object.

20 Claims, 17 Drawing Sheets

DISTANCE MEASURING DEVICE

CROSS REFERENCE TO RELATED APPLICATIONS

This Application claims priority of provisional U.S. Patent Application Ser. No. 62/573,918, filed on Oct. 18, 2017, provisional U.S. Patent Application Ser. No. 62/621,967, filed on Jan. 25, 2018, and China Patent Application No. 201811191146.3 filed on Oct. 12, 2018, the entirety of which are incorporated by reference herein.

BACKGROUND OF THE INVENTION

Field of the Invention

The application relates in general to a distance measuring device, and in particular, to a distance measuring device having a light grating element.

Description of the Related Art

Conventional camera devices provided in cell phones or tablet computers can capture 2D images, but they usually cannot capture 3D images or establish a 3D model of an object. Recently, with the progress being made in Virtual Reality (VR) and Augmented Reality (AR) technologies, to design a distance measuring device that can obtain color and distance information of an object in 3D space has become a popular issue.

BRIEF SUMMARY OF INVENTION

In view of the aforementioned problems, the object of the invention is to provide a distance measuring device for measuring the distance to an object, including a light-emitting module, a driving assembly disposed in the light-emitting module, and a light-receiving module. The light-emitting module has a housing, a light source disposed in the housing, a light grating element, and an optical path adjuster. The light source emits a measuring light sequentially through the optical path adjuster and the light grating element along a first axis. The driving assembly can drive the optical path adjuster or the light grating element to move relative to the housing. The light-receiving module receives the measuring light which is reflected by the object to obtain distance information of the object.

In some embodiments, the driving assembly drives the optical path adjuster to move relative to the housing along the first axis.

In some embodiments, the driving assembly drives the optical path adjuster to move relative to the housing along a second axis perpendicular to the first axis.

In some embodiments, the driving assembly drives the optical path adjuster to rotate relative to the housing around a rotary axis which is perpendicular to the first axis.

BRIEF DESCRIPTION OF DRAWINGS

The invention can be more fully understood by reading the subsequent detailed description and examples with references made to the accompanying drawings, wherein.

DETAILED DESCRIPTION OF INVENTION

The making and using of the embodiments of the distance measuring device are discussed in detail below. It should be appreciated, however, that the embodiments provide many applicable inventive concepts that can be embodied in a wide variety of specific contexts. The specific embodiments discussed are merely illustrative of specific ways to make and use the embodiments, and do not limit the scope of the disclosure.

Unless defined otherwise, all technical and scientific terms used herein have the same meaning as commonly understood by one of ordinary skill in the art to which this invention belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

In the following detailed description of the preferred embodiments, reference is made to the accompanying drawings, and in which specific embodiments of which the invention may be practiced are shown by way of illustration. In this regard, directional terminology, such as "top," "bottom," "left," "right," "front," "back," etc., is used with reference to the orientation of the figures being described. The components of the present invention can be positioned in a number of different orientations. As such, the directional terminology is used for the purposes of illustration and is in no way limiting.

Figure 1:
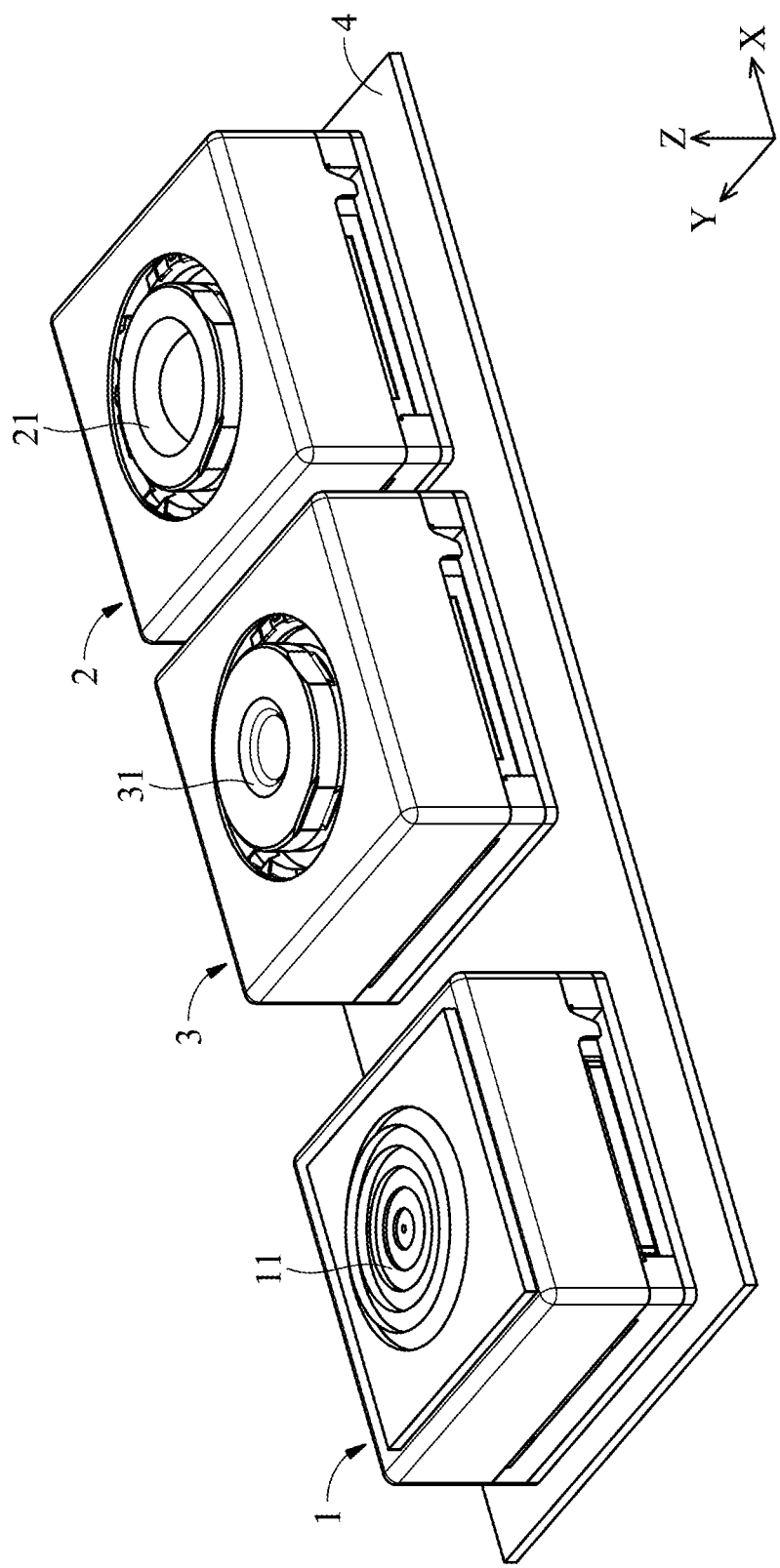
FIG. 1 shows a perspective diagram of a distance measuring device in accordance with an embodiment of the invention.
Figure 2:
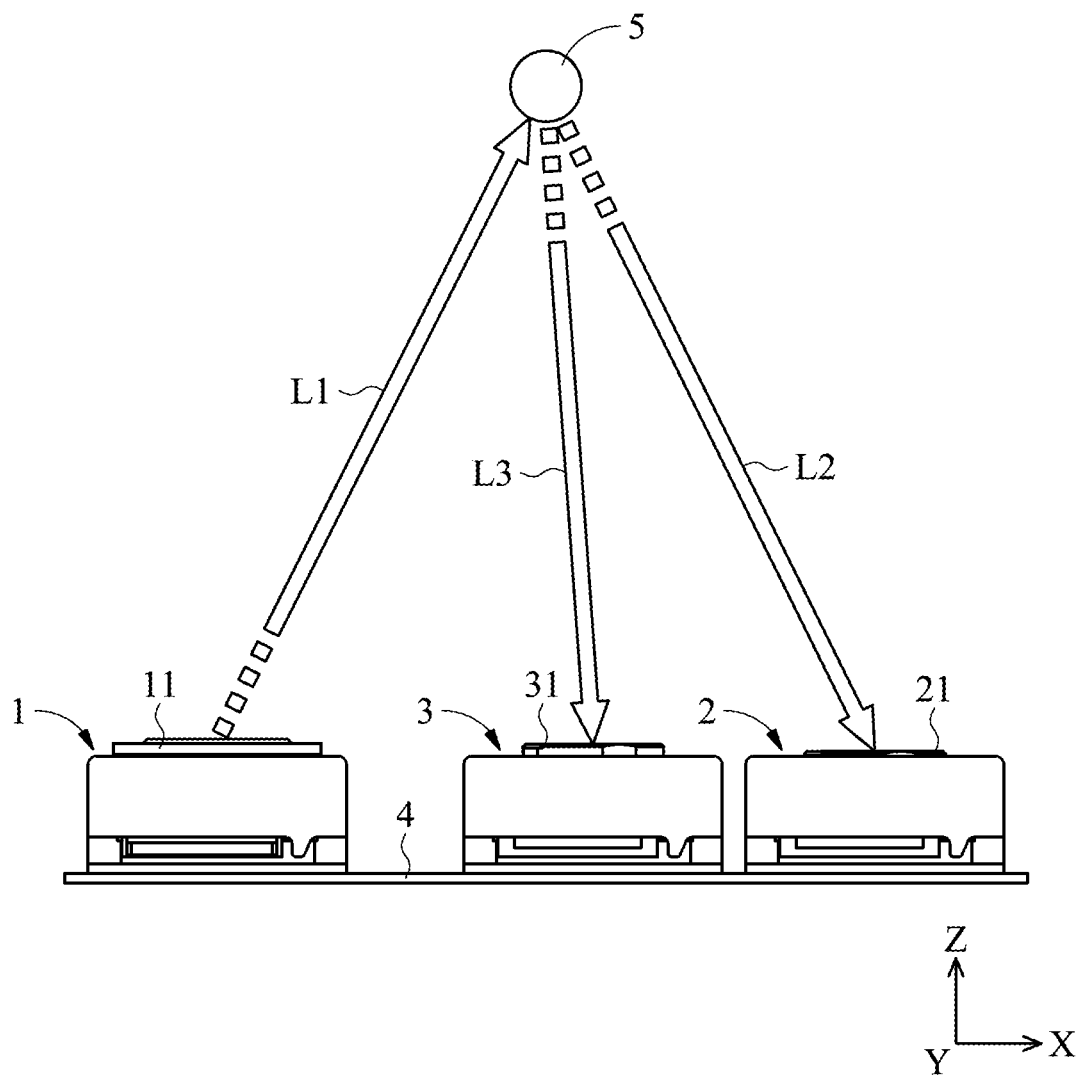
FIG. 2 shows a side view of the distance measuring device in FIG. 1.

Referring to FIGS. 1 and 2, FIG. 1 shows a perspective diagram of a distance measuring device in accordance with an embodiment of the invention, and FIG. 2 shows a side view of the distance measuring device in FIG. 1 when detecting an object 5. As shown in FIGS. 1 and 2, the distance measuring device may be disposed on a cell phone, tablet computer, or other portable electronic equipment, and it primarily comprises a light-emitting module 1, a light-receiving module 2, an image capturing module 3, and a circuit board 4. Here, the light-emitting module 1, the light-receiving module 2, and the image capturing module 3 are disposed on the circuit board 4.

Still referring to FIGS. 1 and 2, during operation of the distance measuring device, a light source inside the light-emitting module 1 can emit a measuring light L1 through a light grating element 11 on the top of the light-emitting module 1 to an object 5, and the measuring light L1 is then reflected by the object 5 and generate two reflected lights L2 and L3 at different angles. The reflected light L2 propagates through an optical lens 21 and an IR pass filter to an image sensor inside the light-receiving module 2, and the reflected light L3 propagates through an optical lens 31 and an IR cut filter to another image sensor inside the image capturing module 3.

It should be noted the light-receiving module 2 is used for receiving infrared light reflected by the object 5, so as to obtain distance or depth information of the object 5. The image capturing module 3 is used for receiving visible light reflected by the object 5, so as to obtain a color image and related color information of the object 5.

In some embodiments, the measuring light L1 may be projected on the object 5 to form a plurality of light spots in a matrix. As mentioned above, the receiving module 2 and the image capturing module 3 can respectively receive infrared light and visible light which are reflected by the object 5, whereby a 3D model with color information of the object 5 can be established.

Figure 3:
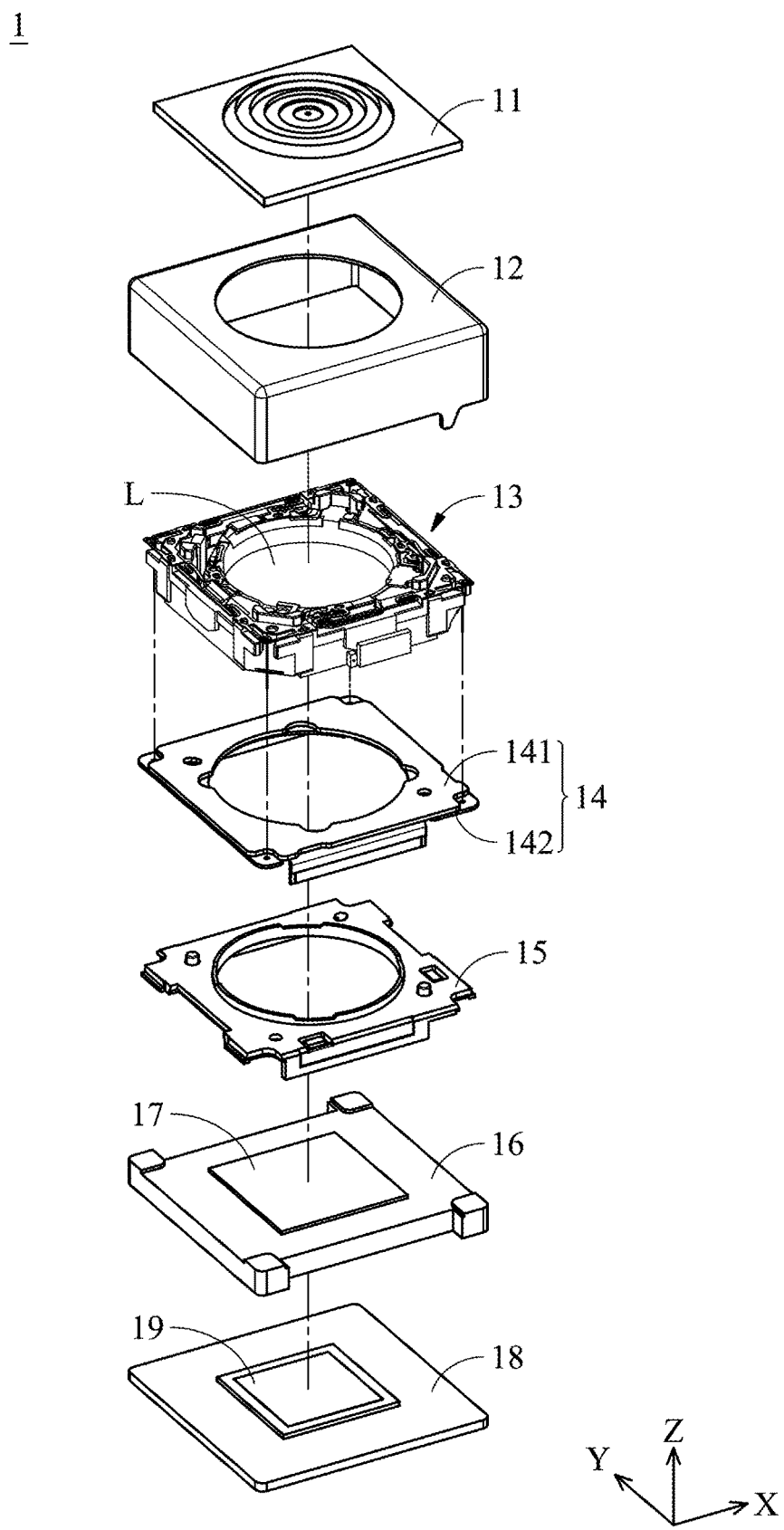
FIG. 3 shows an exploded diagram of the light-emitting module 1 in FIGS. 1 and 2.

FIG. 3 shows an exploded diagram of the light-emitting module 1 in FIGS. 1 and 2. As shown in FIG. 3, the light-emitting module 1 primarily comprises a light grating element 11, a hollow housing 12, a movable mechanism 13, a circuit unit 14, a base 15, a support 16, a beam expander 17, a substrate 18, and a light source 19. The light grating element 11 may comprise a Fresnel lens or Diffraction Optical Element (DOE) disposed above the housing 12. The movable mechanism 13, the circuit unit 14, the base 15 are received in an interior space of the housing 12.

In this embodiment, the beam expander 17 is disposed on the support 16, the light source 19 is disposed on the substrate 18, and the base 15 and the support 16 are stacked on the substrate 18. The housing 12 and the circuit unit 14 are affixed to the base 15, wherein the circuit unit 14 comprises a fine pattern coil 141 (FP-Coil) and a flexible printed circuit board 142. The fine pattern coil 141 can be electrically connected to an external circuit via the flexible printed circuit board 142. Additionally, the movable mechanism 13 is movably disposed in the housing 12, wherein a collimating lens L is disposed at the center of the movable mechanism 13.

Each of the collimating lens L and the beam expander 17 can be used as an optical path adjuster for guiding light and adjusting the optical path of the measuring light L1 from the light source 19 to the light grating element 11. Therefore, the measuring light L1 can be guided to sequentially propagate through the beam expander 17, the collimating lens L, and the light grating element 11 to the object 5. Subsequently, the measuring light L1 can be reflected by the object 5 to the receiving module 2 and the image capturing module 3, thereby obtaining distance and color information of the object 5 in 3D space.

Figure 4:
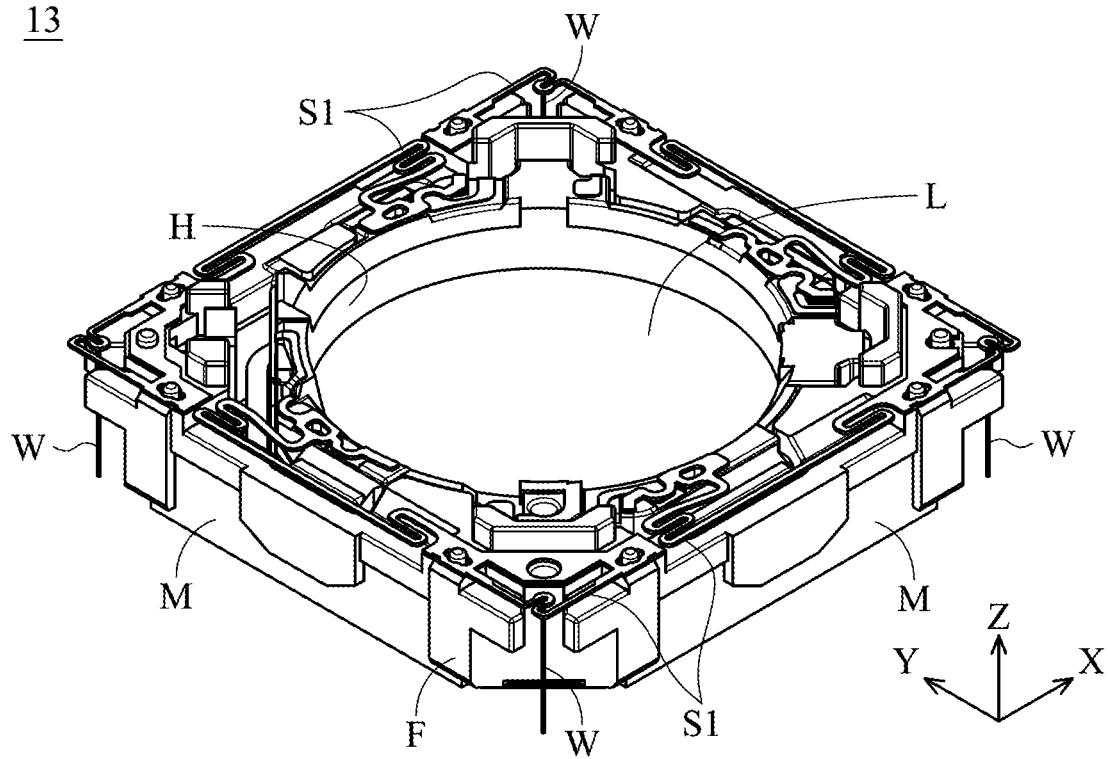
FIGS. 4 and 5 are two perspective diagrams of the movable mechanism 13 in FIG. 3 from different viewing angles.
Figure 5:
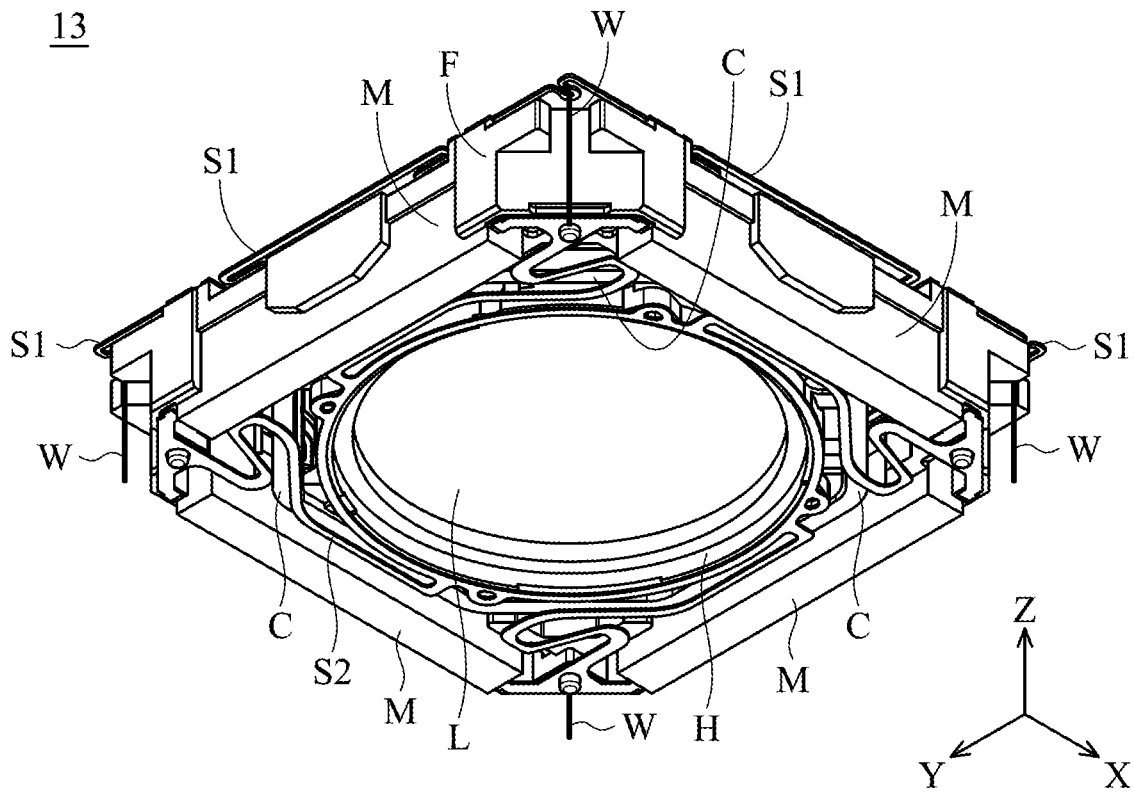

FIGS. 4 and 5 are two perspective diagrams of the movable mechanism 13 in FIG. 3 from different viewing angles. As shown in FIGS. 4 and 5, the movable mechanism 13 primarily comprises a frame F, a holder H, a plurality of magnetic elements M (e.g. magnets) affixed to the frame F, at least a coil C surrounding the holder H, and a collimating lens L disposed at the center of the holder H.

In this embodiment, the holder H is connected to the frame F via a plurality of upper spring sheets S1 and a lower spring sheet S2, so that the holder H and the collimating lens L are movable relative to the housing 12 along the Z axis (first axis). Moreover, the frame F is connected to the circuit unit 14 via several thin and flexible metal members W, so that the holder H and the frame F can move relative to the circuit unit 14 and the base 15 along a horizontal direction perpendicular to the Z axis.

It should be noted that at least one of the magnetic elements M and the coil C on the holder H can constitute a driving assembly for driving the holder H and the collimating lens L to move. In some embodiments, the receiving module 2 or the image capturing module 3 can receive and transfer the light reflected by the object 5 into an electrical signal, and the electrical signal can be transferred to a control unit (not shown) via the circuit board 4. If the intensity of the light received by the receiving module 2 or the image capturing module 3 is less than a predetermined value, the control unit can generate a driving signal to the driving assembly (e.g. applying a current signal to the coil C). Thus, an electromagnetic force between the magnetic element M the coil C can be produced, and the holder H and the collimating lens L can be driven to move relative to the frame F and the housing 12 along the Z axis (first axis), whereby the quality and intensity of the measuring light L1 can be efficiently improved.

Similarly, at least one of the magnetic elements M and the fine pattern coil 141 below the magnetic element M may also constitute a driving assembly for driving the holder H, the collimating lens L, and the frame F to move. For example, when the object 5 is located outside of the measuring range of the measuring light L1, the receiving module 2 or the image capturing module 3 may not able to receive light to establish the profile of the object 5. In this case, the control unit can generate a driving signal to the driving assembly (e.g. applying a current signal to the fine pattern coil 141) so that an electromagnetic force between the magnetic element M the fine pattern coil 141 can be generated. Therefore, the holder H, the collimating lens L, and the frame F can be driven to move relative to the housing 12 along the X or Y axis (second axis), whereby the quality and emitting angle of the measuring light L1 can be improved and adjusted.

Figure 6:
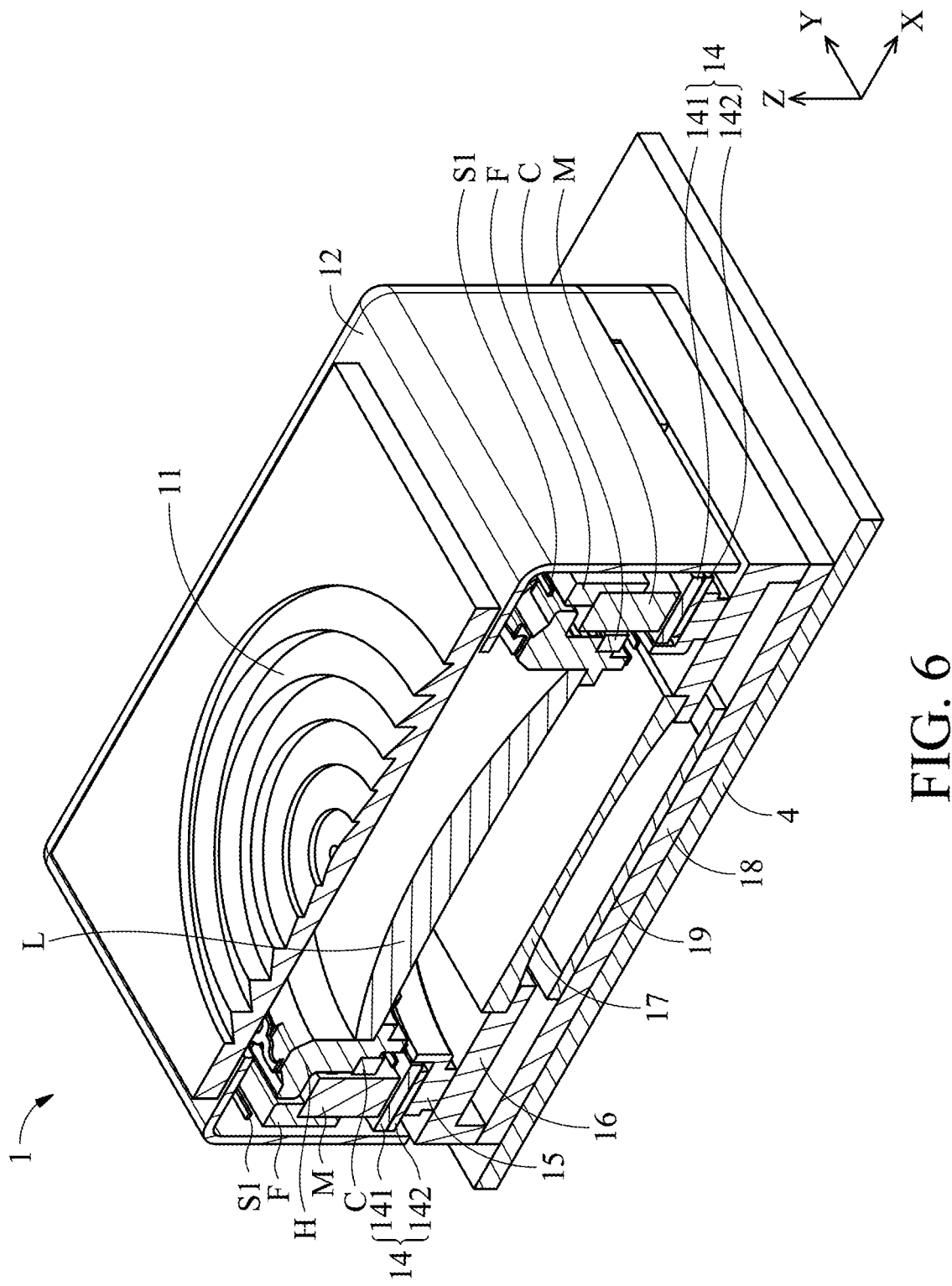
FIGS. 6 and 7 are cross-sectional views showing the light-emitting module 1 and a part of the circuit board 4 after assembly.
Figure 7:
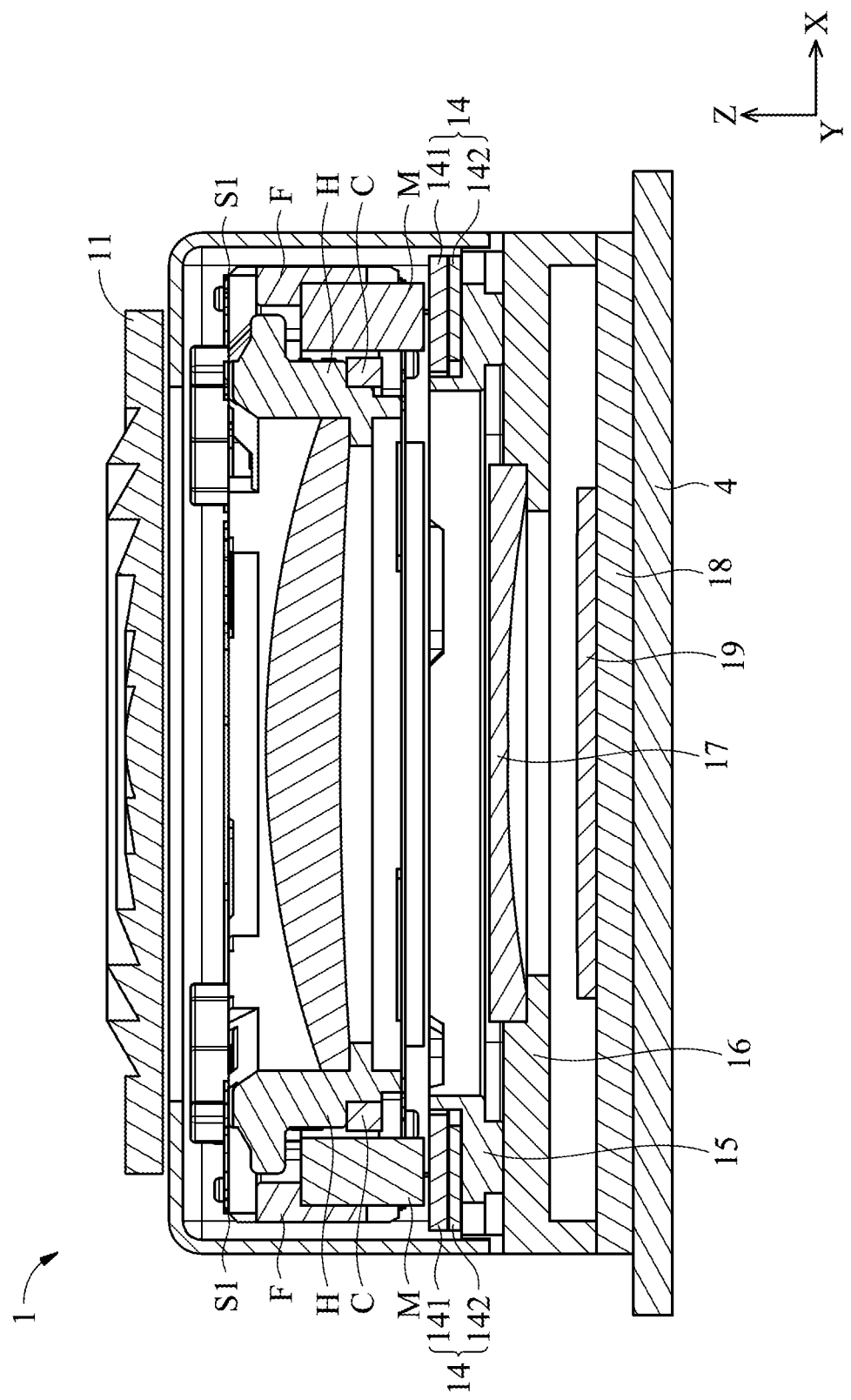

FIGS. 6 and 7 are cross-sectional views showing the light-emitting module 1 and a part of the circuit board 4 after assembly. As shown in FIGS. 6 and 7, the light source 19, the beam expander 17, the collimating lens L, and the light grating element 11 are sequentially arranged along the Z axis. An electromagnetic force can be generated between the magnetic elements M and the coil C to drive the holder H and the collimating lens L to move relative to the frame F and the housing 12 along the Z axis (first axis). Moreover, the magnetic elements M and the fine pattern coil 141 can also produce an electromagnetic force to drive the holder H, the collimating lens L, and the frame F to move relative to the housing 12 along the X or Y axis (second axis), thus appropriately adjusting the emitting angle and improving the quality and of the measuring light L1.

Figure 8:
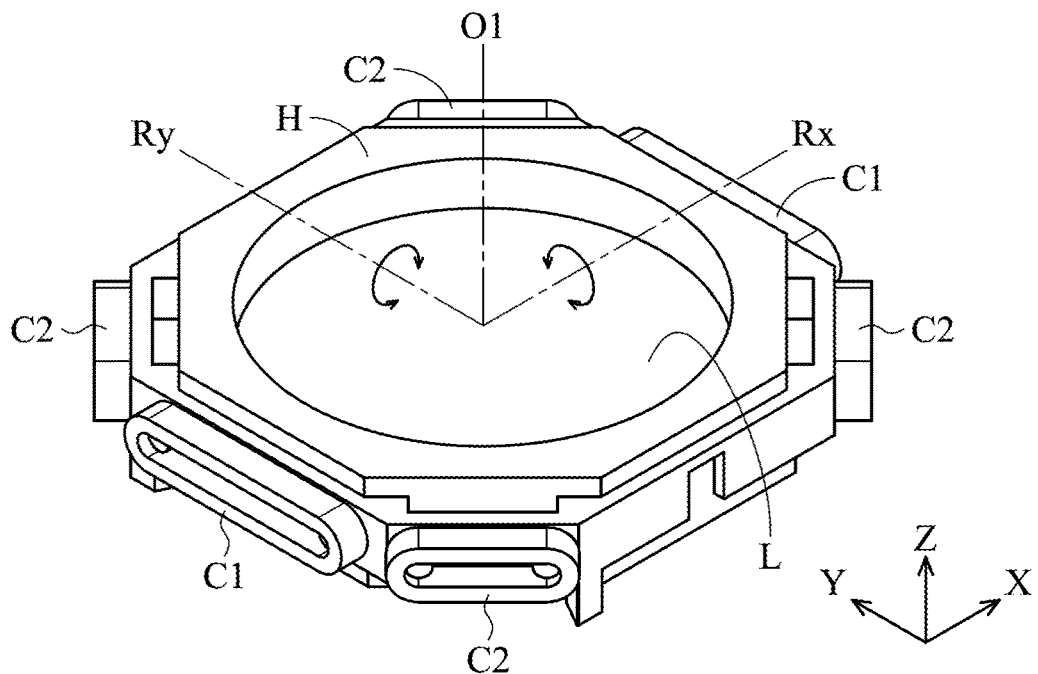
FIG. 8 is a perspective diagram showing a holder H, a collimating lens L disposed in the holder H, and several coils C1 and C2 disposed on the lateral sides of the holder H in accordance with another embodiment of the invention.
Figure 9:
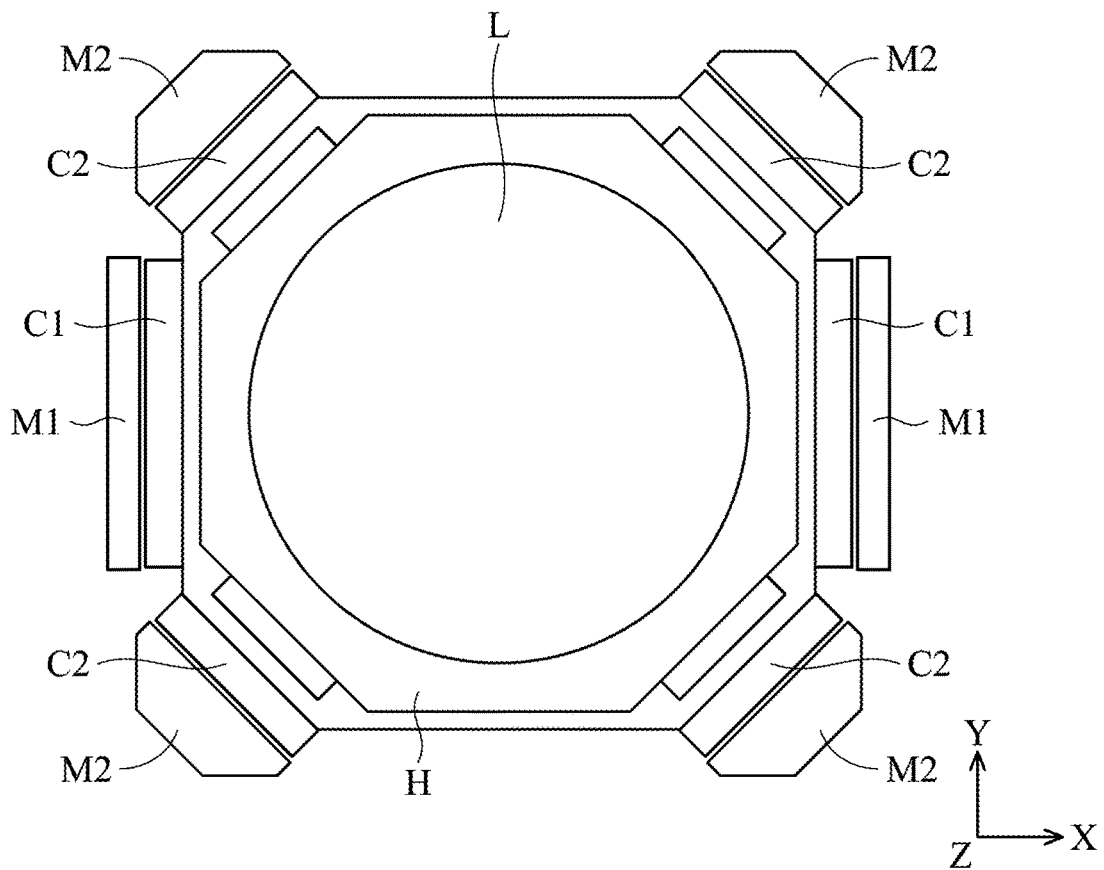
FIG. 9 is a perspective diagram showing relative position of the holder H, the collimating lens L, and the coils C1 and C2 in FIG. 8, and several magnetic elements M1 and M2 after assembly.
Figure 10:
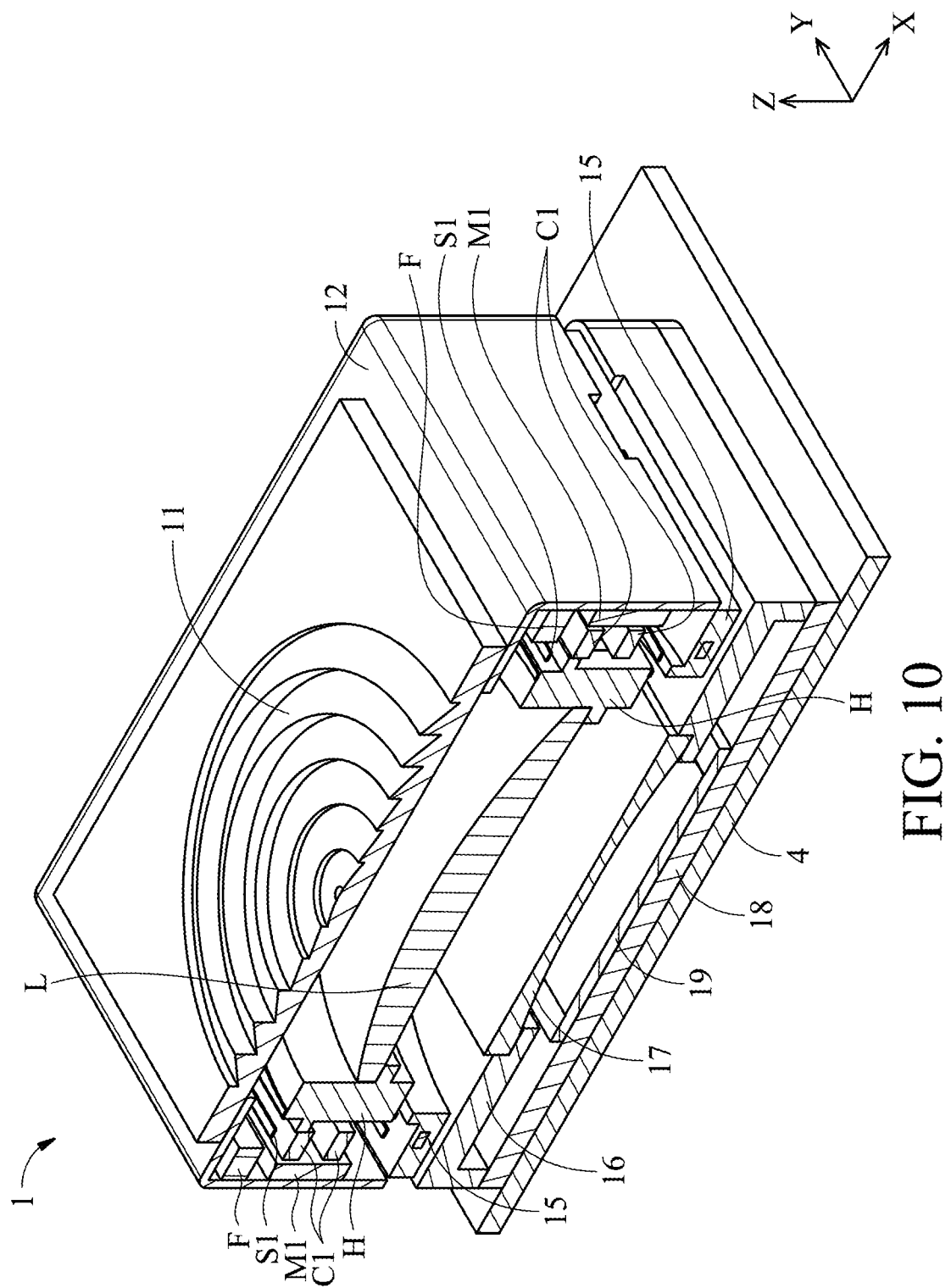
FIG. 10 is cross-sectional view of a light-emitting module 1 comprising the holder H, the collimating lens L, the coils C1 and C2, and the magnetic elements M1 and M2 in FIG. 9 which are assembled with other components.

FIG. 8 is a perspective diagram showing a holder H, a collimating lens L disposed in the holder H, and several coils C1 and C2 disposed on the lateral sides of the holder H in accordance with another embodiment of the invention. FIG. 9 is a perspective diagram showing relative position of the holder H, the collimating lens L, and the coils C1 and C2 in FIG. 8, and several magnetic elements M1 and M2 after assembly. FIG. 10 is cross-sectional view of a light-emitting module 1 comprising the holder H, the collimating lens L, the coils C1 and C2, and the magnetic elements M1 and M2 in FIG. 9 which are assembled with other components.

As shown in FIGS. 8-10, the coils C1 and C2 have an oval structure and are disposed on different sides of the holder H. The two coils C1 are disposed on opposite sides of the quadrilateral holder H, corresponding to the magnetic elements M1 (e.g. magnets) affixed to the frame F or the housing 12. The other four coils C2 are respectively disposed at the four corners of the holder H, corresponding to the four magnetic elements M2 (e.g. magnets) affixed to the frame F or the housing 12.

As the holder H is suspended within the frame F via the upper and lower spring sheets S1 and S2, an electromagnetic force can be generated between the magnetic elements M and the coils C1 when an electrical current is applied to the coils C1. Hence, the holder H and the collimating lens L can be driven to move relative to the frame F and the housing 12 along the Z axis (first axis). When the object 5 is outside of the measuring range of the measuring light L1, different magnitudes of electrical currents may be individually applied to the coils C2 at the corners of the holder H, so that a torque is exerted on the holder H and the collimating lens L. As a result, the holder H and the collimating lens L can rotate relative to the frame F and the housing 12 around the rotary axis Rx or Ry (as the arrows indicate in FIG. 8), thereby adjusting the emitting angle and improving the quality of the measuring light L1. In this embodiment, the rotary axes Rx and Ry are substantially perpendicular to the optical axis O1 of the collimating lens L and the Z axis (first axis).

Figure 11:
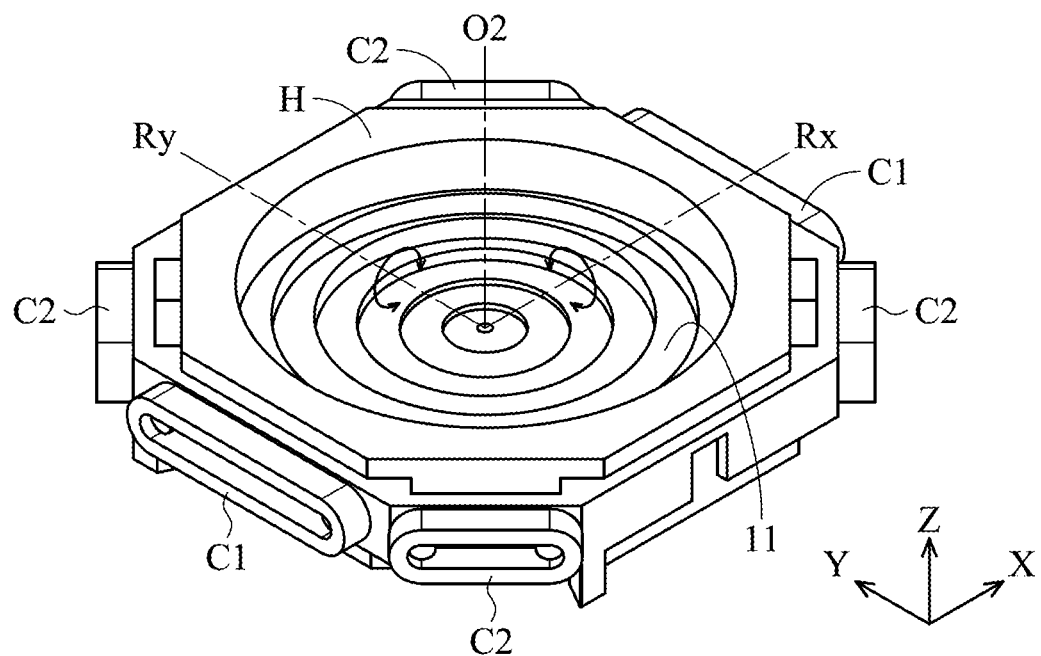
FIG. 11 is a perspective diagram showing a holder H, a light grating element 11 disposed in the holder H, and several coils C1 and C2 disposed on the lateral sides of the holder H in accordance with another embodiment of the invention.
Figure 12:
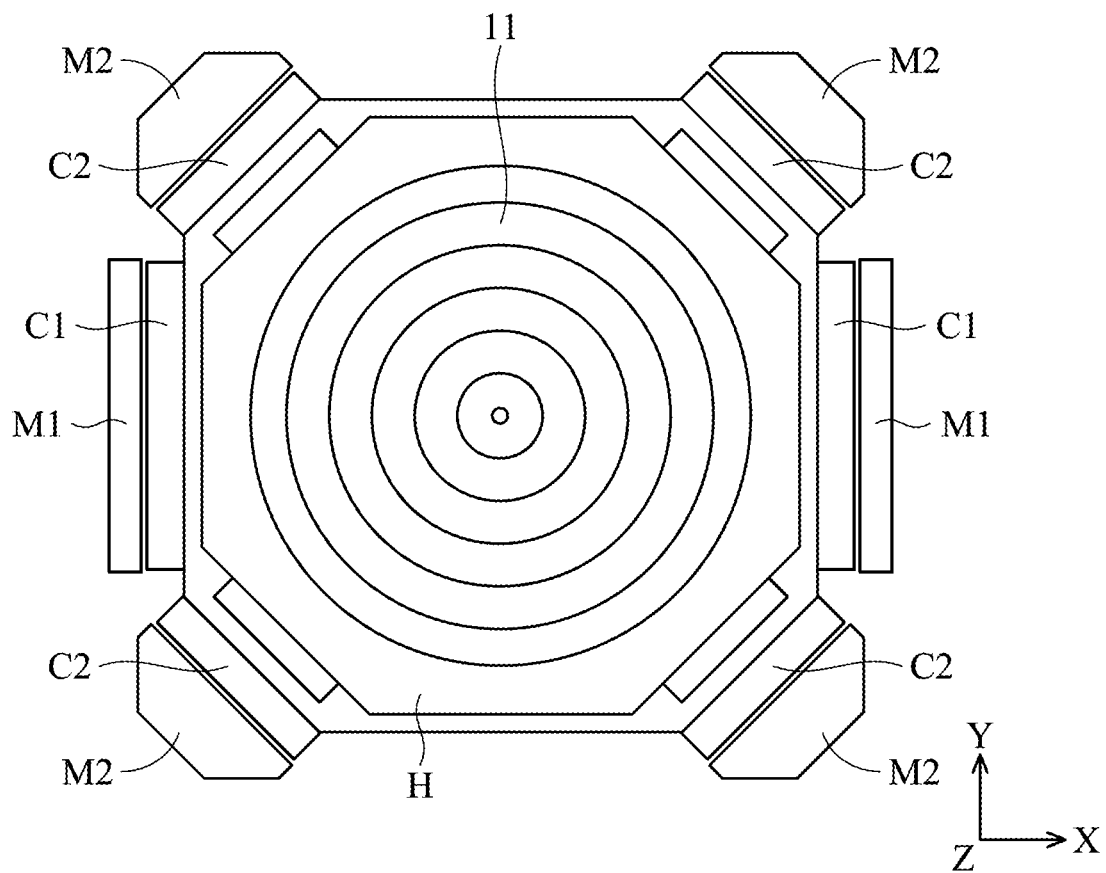
FIG. 12 is a perspective diagram showing relative position of the holder H, the light grating element 11, the coils C1 and C2, and several magnetic elements M1 and M2 after assembly.
Figure 13:
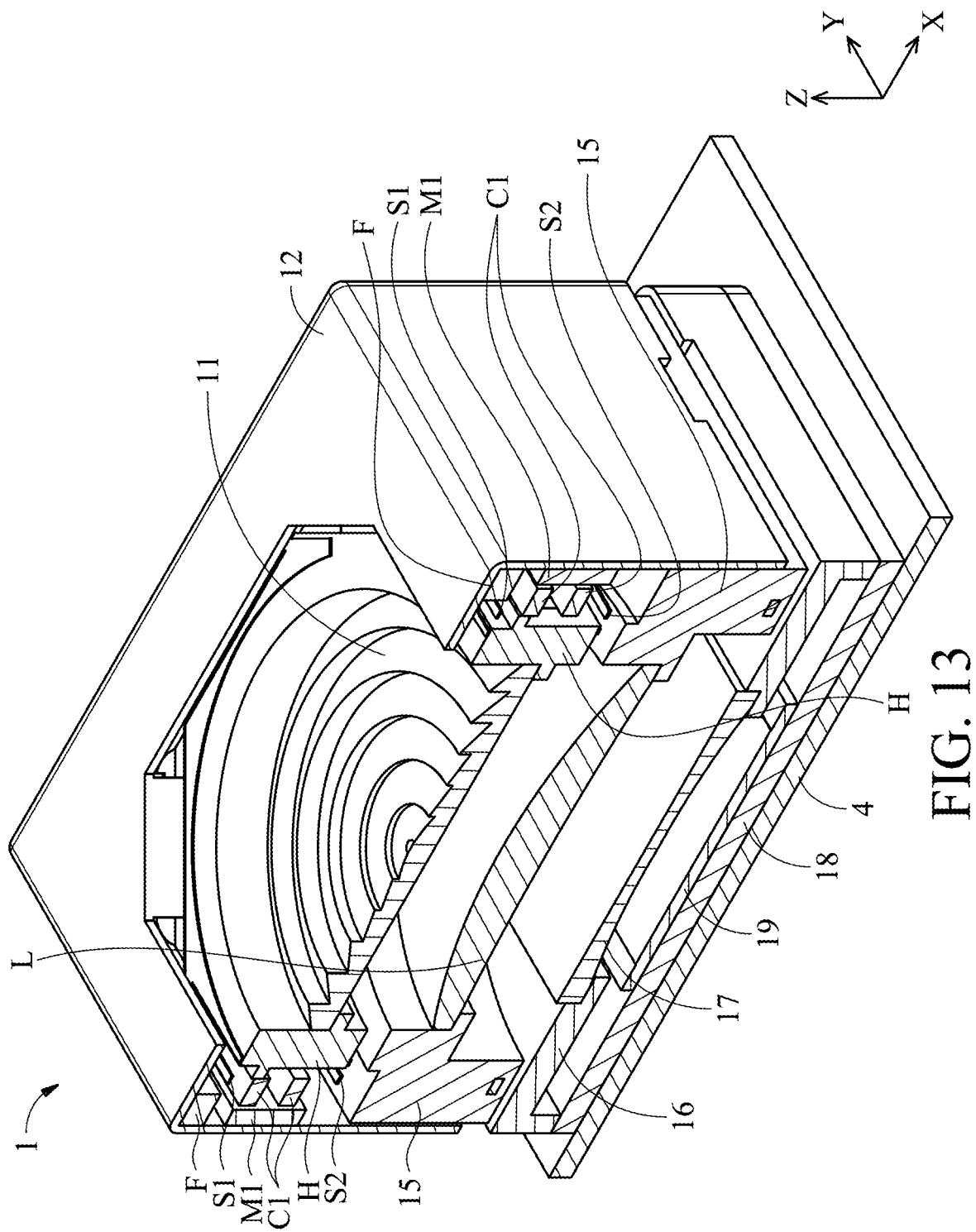
FIG. 13 is cross-sectional view of the holder H, the light grating element 11, the coils C1 and C2, and the magnetic elements M1 and M2 in FIG. 12 which are assembled with other components to form of the light-emitting module 1.

FIG. 11 is a perspective diagram showing a holder H, a light grating element 11 disposed in the holder H, and several coils C1 and C2 disposed on the lateral sides of the holder H in accordance with another embodiment of the invention. FIG. 12 is a perspective diagram showing relative position of the holder H, the light grating element 11, the coils C1 and C2, and several magnetic elements M1 and M2 after assembly. FIG. 13 is cross-sectional view of the holder H, the light grating element 11, the coils C1 and C2, and the magnetic elements M1 and M2 in FIG. 12 which are assembled with other components to form of the light-emitting module 1.

The light-emitting module 1 in FIG. 13 is different from FIG. 10 in that the collimating lens L is disposed on the base 15, and the light grating element 11 is disposed in the holder H. The frame F in FIG. 13 affixed to the inner surface of the housing 12, and the holder H is connected to the frame F via the upper and lower springs S1 and S2, so that the holder H is suspended within the frame F.

As shown in FIGS. 11 and 12, the coils C1 and C2 in this embodiment have an oval structure and are disposed on different sides of the holder H. The two coils C1 are disposed on opposite sides of the quadrilateral holder H, corresponding to the magnetic elements M1 (e.g. magnets) affixed to the frame F or the housing 12. The other four coils C2 are respectively disposed at the four corners of the holder H, corresponding to the four magnetic elements M2 (e.g. magnets) affixed to the frame F or the housing 12.

When an electrical current is applied to the coils C1, an electromagnetic force can be generated between the magnetic elements M and the coils C1 to move the holder H and the light grating element 11 relative to the frame F and the housing 12 along the Z axis (first axis). When the object 5 is outside of the measuring range of the measuring light L1, different magnitudes of electrical currents may be applied to the coils C2 at the corners of the holder H, so that a torque is exerted on the holder H and the light grating element 11. As a result, the holder H and the light grating element 11 can rotate relative to the frame F and the housing 12 around the rotary axis Rx or Ry (as the arrows indicate in FIG. 11), thereby adjusting the emitting angle and improving the quality of the measuring light L1. In this embodiment, the rotary axes Rx and Ry are substantially perpendicular to the optical axis O2 of the light grating element 11 and the Z axis (first axis).

In some embodiments, the beam expander 17 or other optical path adjuster can also be disposed on the holder H which is suspended within the frame F. Hence, the beam expander 17 or other optical path adjuster can be driven to move along X, Y or Z axis, or rotate around the rotary axis Rx or Ry, whereby the quality, intensity, and emitting angle of the measuring light L1 can be efficiently improved.

Figure 14:
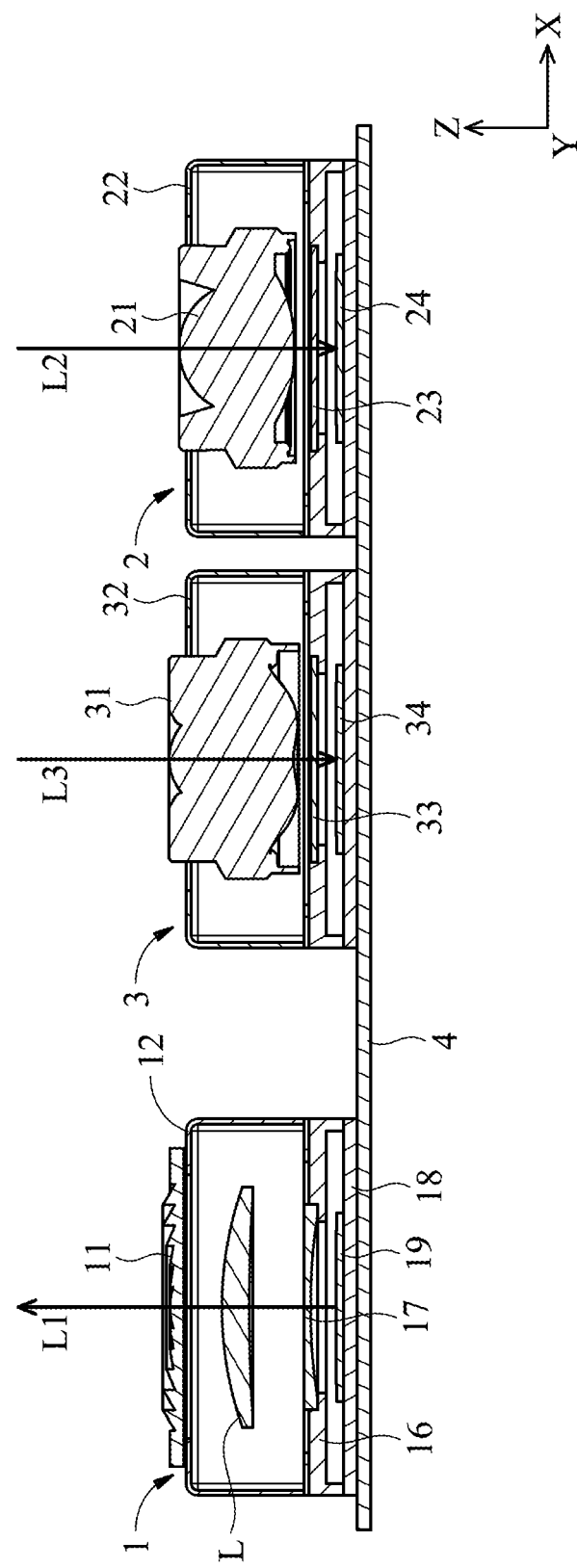
FIG. 14 is a cross-sectional view of the distance measuring device in FIG. 1, wherein some parts in the light-emitting module 1.

FIG. 14 is a cross-sectional view of the distance measuring device in FIG. 1, wherein some parts in the light-emitting module 1, the light-receiving module 2, and the image capturing module 3 are omitted from FIG. 14 for clarity. As shown in FIG. 14, the light source 19 inside the light-emitting module 1 can emit the measuring light L1 substantially along the Z axis (first axis) through beam expander 17, the collimating lens L, and the light grating element 11, so as to form light spots on the object 5 (FIG. 2) in a matrix. The measuring light L1 is then reflected by the object 5, wherein the reflected light L2 propagates through the optical lens 21 and a light filter 23 (e.g. infrared-pass filter) to an image sensor 24 inside the light-receiving module 2, and the reflected light L3 propagates through the optical lens 31 and a light filter 33 (e.g. infrared-cut filter) to an image sensor 34 inside the image capturing module 3.

It should be noted that the light-receiving module 2 can receive infrared light which is reflected by the object 5, so as to obtain a non-color image with distance/depth information of the object 5. Additionally, the image capturing module 3 can receive visible light which is reflected by the object 5, so as to obtain a color image and related color information of the object 5. Specially, the light-receiving module 2 and the image capturing module 3 can transfer the non-color image and the color image to an image processing module (not shown) via the circuit board 4, and the image processing module can combine the color image with the non-color image to generate a 3D composite image, whereby a 3D model with color information of the object 5 can be established.

Figure 15:
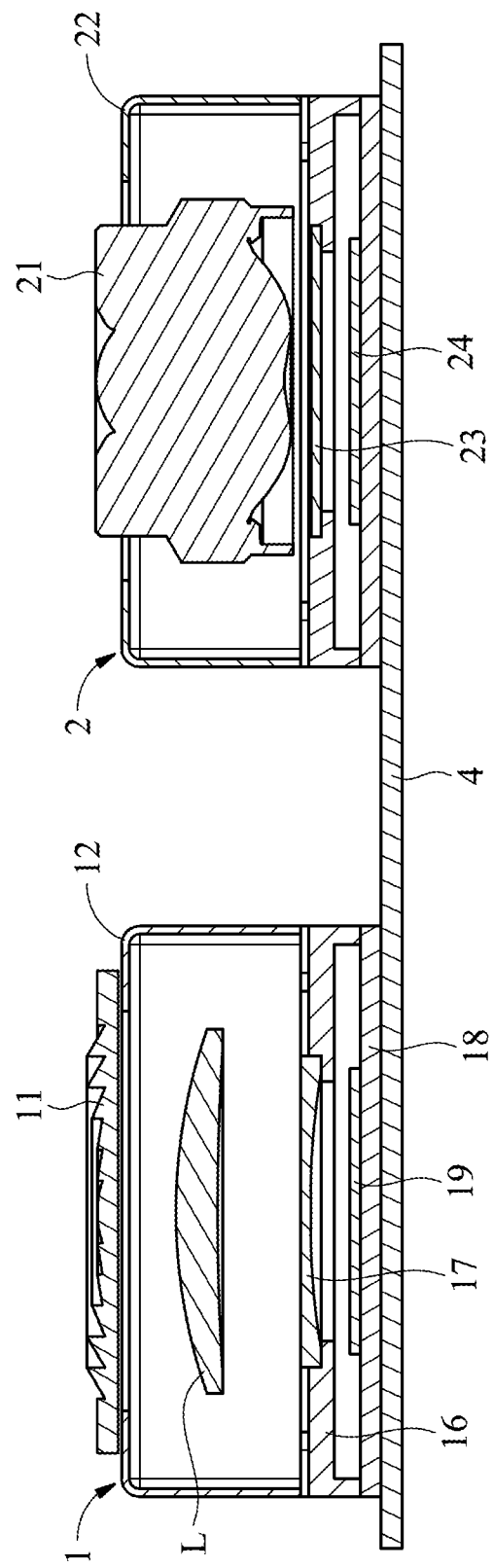
FIG. 15 is a cross-sectional view of the distance measuring device 1 in accordance with another embodiment of the invention.

FIG. 15 is a cross-sectional view of the distance measuring device 1 in accordance with another embodiment of the invention, wherein the image capturing module 3 in FIG. 14 is omitted from FIG. 15, and the light source 19 inside the light-emitting module 1 can emit both infrared light and visible light. Moreover, the image sensor 24 inside the receiving module 2 can receive both infrared light and visible light which are reflected by the object 5.

Figures 16, 17:
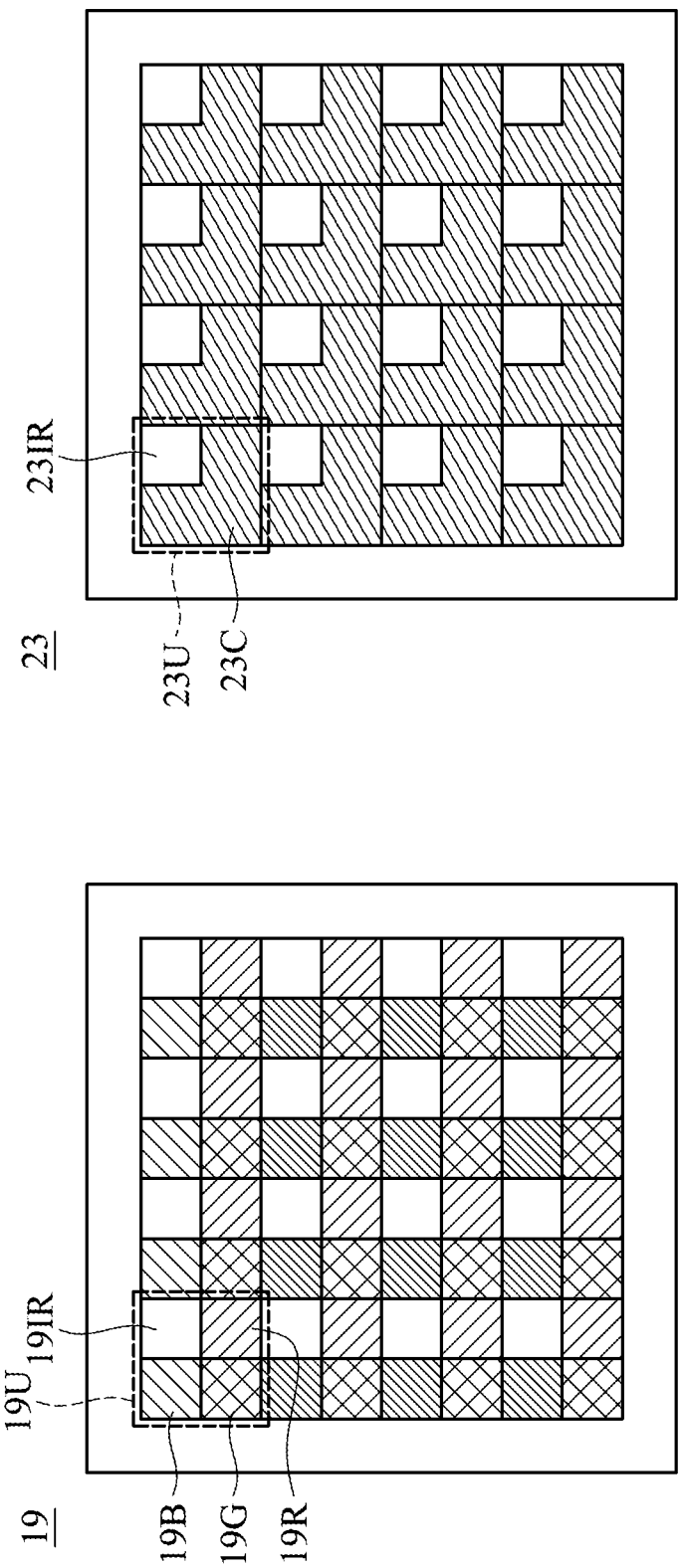
FIG. 16 is a top view of the light source 19 which comprises a plurality of light-emitting units 19U arranged in a matrix.
FIG. 17 is a top view of the light filter 23 which comprises a plurality of light filtering units 23U arranged in a matrix.

In this embodiment, as shown in FIG. 16, the light source 19 in the light-emitting module 1 comprises a plurality of light-emitting units 19U arranged in a matrix. Each of the light-emitting units 19U has a first light-emitting element 19IR and a plurality of second light-emitting elements 19R, 19G, and 19B. The first light-emitting element 19IR can generate infrared light, and the second light-emitting elements 19R, 19G, and 19B can respectively generate red, green, and blue light (visible light). Hence, the light-emitting module 1 can project infrared light and visible light onto the object 5 at the same time.

Moreover, as shown in FIG. 17, the light filter 23 in the light-receiving module 2 comprises a plurality of light filtering units 23U arranged in a matrix. Specifically, each of the light filtering units 23U has a first filtering portion 23IR (infrared-pass filtering portion) and an L-shaped second filtering portion 23C.

Figure 18:
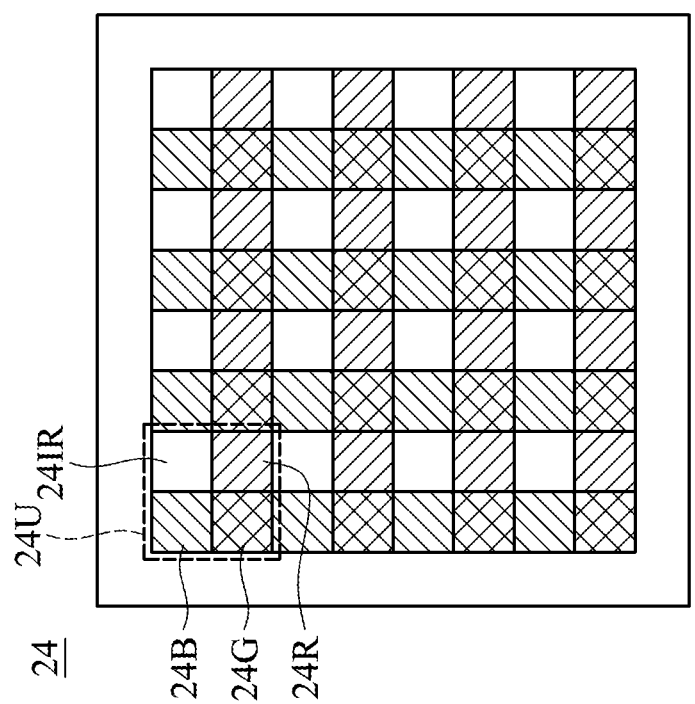
FIG. 18 is a top view of the image sensor 24 which comprises a plurality of photosensitive units 24U arranged in a matrix.

Referring to FIG. 18, the image sensor 24 in the light-receiving module 2 comprises a plurality of photosensitive units 24U arranged in a matrix. Each of the photosensitive units 24U has a first sensing element 24IR and a plurality of second sensing elements 24R, 24G, and 24B. The first sensing element 24IR can receive infrared light reflected by the object 5, and the second sensing elements 24R, 24G, and 24B can respectively receive red, green, and blue light (visible light) reflected by the object 5.

It should be noted that the first sensing elements 24IR are located corresponding to the first filtering portions 23IR of the light filter 23, and the second sensing elements 24R, 24G, and 24B are located corresponding to the second filtering portions 23C of the light filter 23. Thus, light reflected by the object 5 can be filtered by the light filter 23 and divided into visible light and infrared light. That is, the image sensor 24 can receive infrared light by the first sensing elements 24IR, and the image sensor 24 can receive visible light by the second sensing elements 24R, 24G, and 24B, so that a 3D model with color and instance information of the object 5 can be established.

Figure 19:
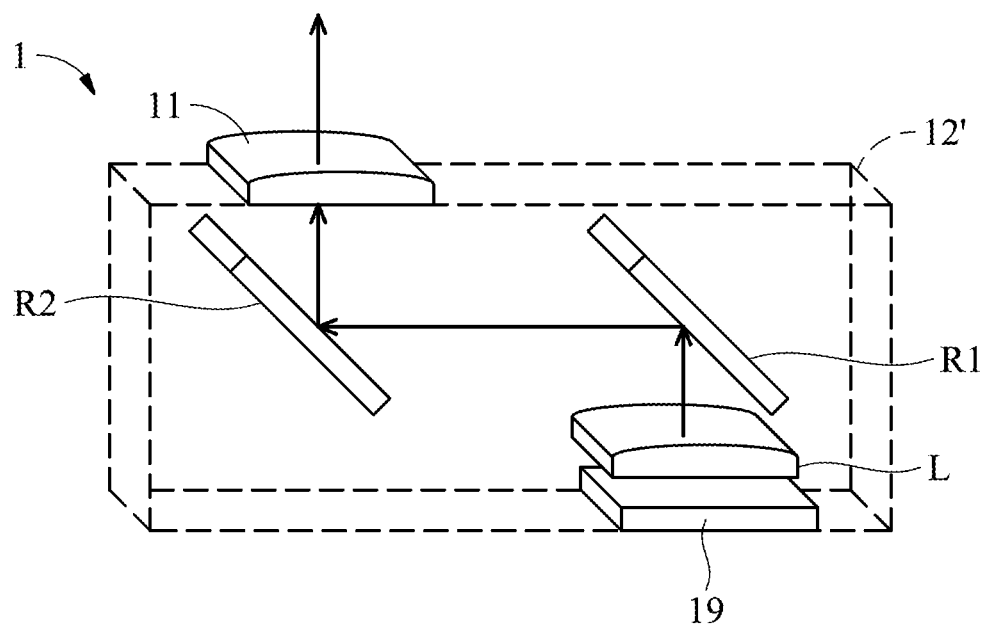
FIG. 19 is a perspective diagram showing a light-emitting module 1 in accordance with another embodiment of the invention.

FIG. 19 is a perspective diagram showing a light-emitting module 1 in accordance with another embodiment of the invention. As shown in FIG. 19, two reflecting elements R1 and R2 can be provided in the light-emitting module 1 of all the aforementioned embodiments, wherein the reflecting elements R1 and R2 are disposed on the optical path between the light grating element 11 and the light source 19. Here, the light source 19, the collimating lens L (or other optical path adjusters), and the reflecting elements R1 and R2 may be received in an accommodating space 12' of the housing 12. Light emitted from the light source 19 can be sequentially reflected by the reflecting elements R1 and R2, and then propagate upward through the light grating element 11.

By the arrangement of the two reflecting elements R1 and R2, the total length of the optical path between the light grating element 11 and the light source 19 can be increased, so that the size of the light-emitting module 1 in the vertical direction can be reduced, and miniaturization of the distance measuring device can be achieved.

Figure 20:
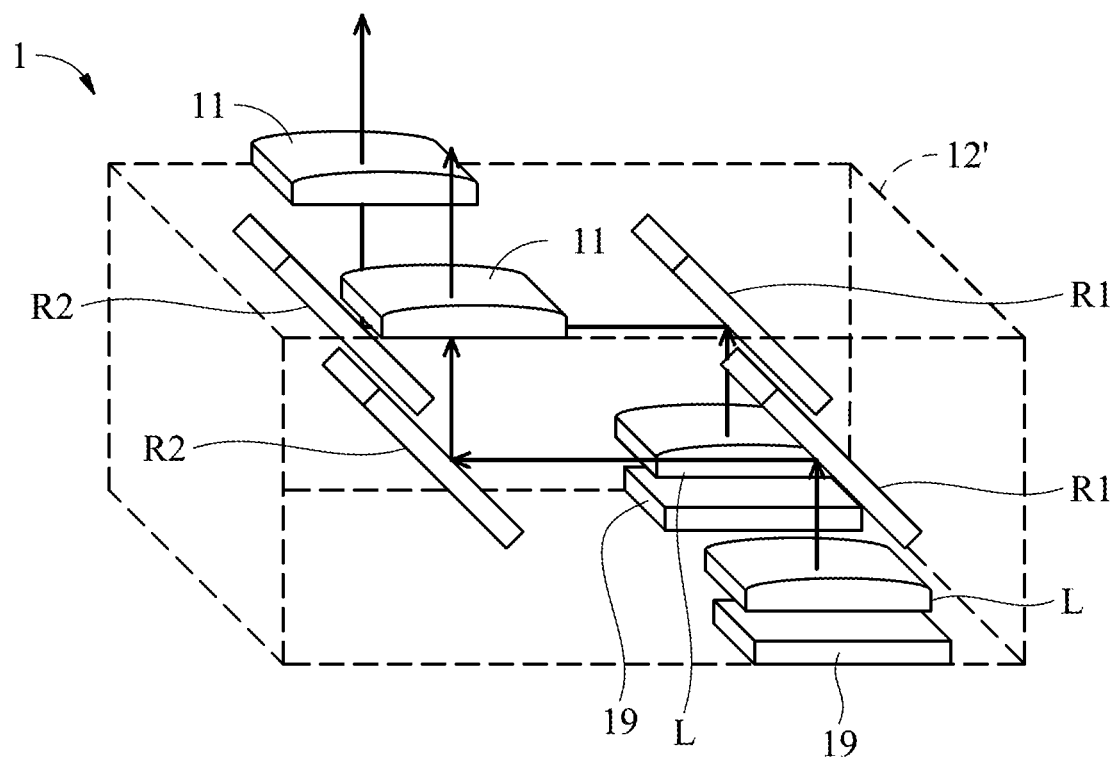
FIG. 20 is a perspective diagram showing a light-emitting module 1 in accordance with another embodiment of the invention.

FIG. 20 is a perspective diagram showing a light-emitting module 1 in accordance with another embodiment of the invention. The light-emitting module 1 of FIG. 20 is different from FIG. 19 in that the light-emitting module 1 comprises two sets of light sources 19, collimating lenses L (or other optical path adjusters), reflecting elements R1 and R2, and light grating elements 11. Specifically, the two light sources 19 can respectively emit infrared light and visible light. The light-receiving module 2 and the image capturing module 3 can receive infrared light and visible light which is reflected by the object 5, so as to establish a 3D model of the object 5 with color and instance information.

Figure 21:
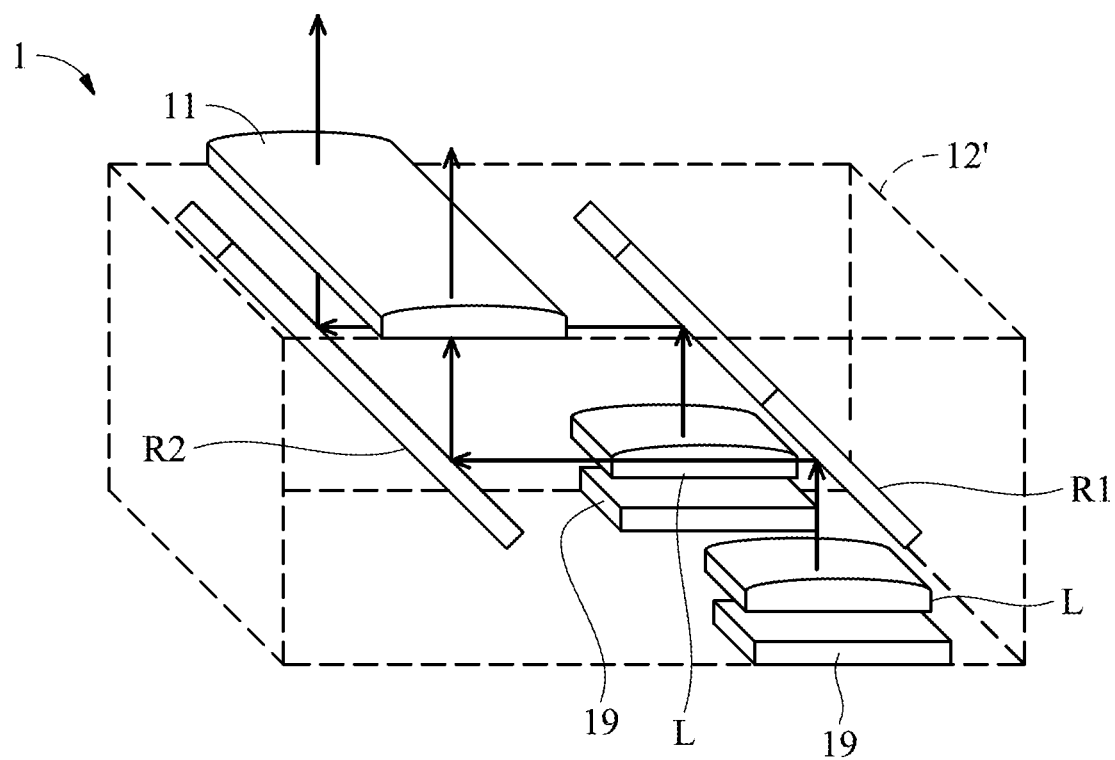
FIG. 21 is a perspective diagram showing a light-emitting module 1 in accordance with another embodiment of the invention.

In another embodiment of FIG. 21, the light-emitting module 1 is provided with a light grating element 11, two reflecting elements R1 and R2, two light sources 19, and two collimating lenses L (or other optical path adjusters). The light sources 19 can respectively emit infrared light and visible light through the collimating lenses L, and light can be reflected by the reflecting elements R1 and R2 and propagate through the light grating element 11.

Figure 22:
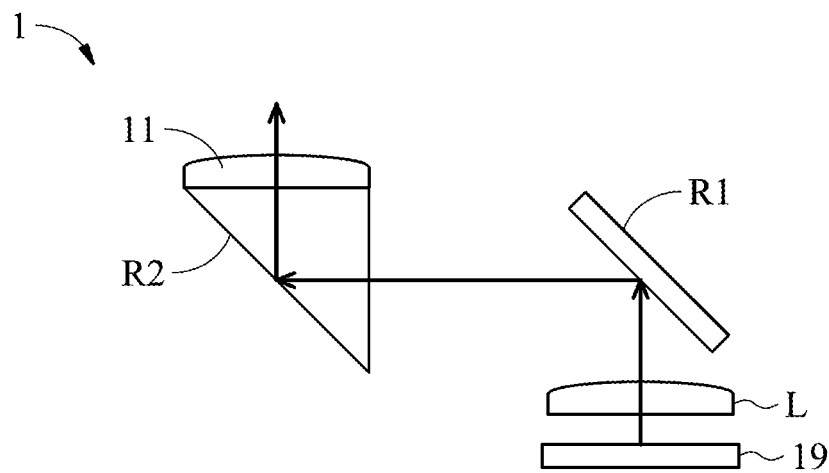
FIG. 22 is a perspective diagram showing the light grating element 11 of the light-emitting module 1 attached to a surface of the reflecting element R2.
Figure 23:
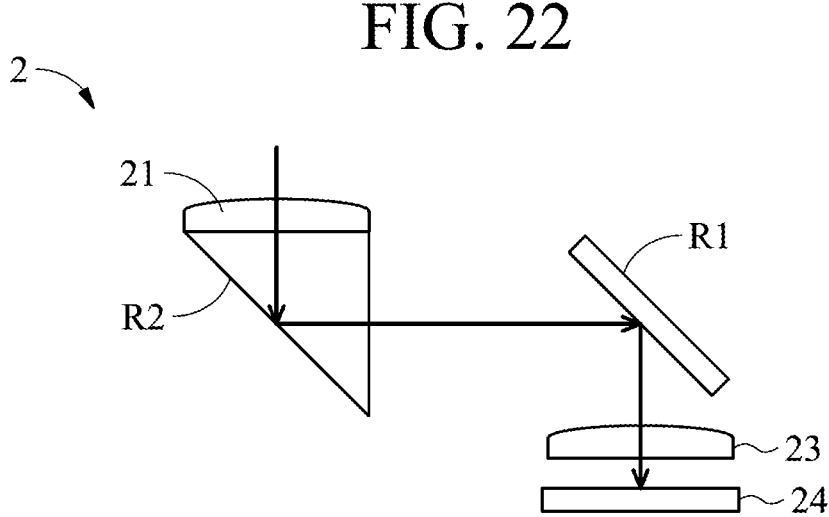
FIG. 23 is a perspective diagram showing the optical lens 21 of the light-receiving module 2 attached to a surface of the reflecting element R2.
Figure 24:
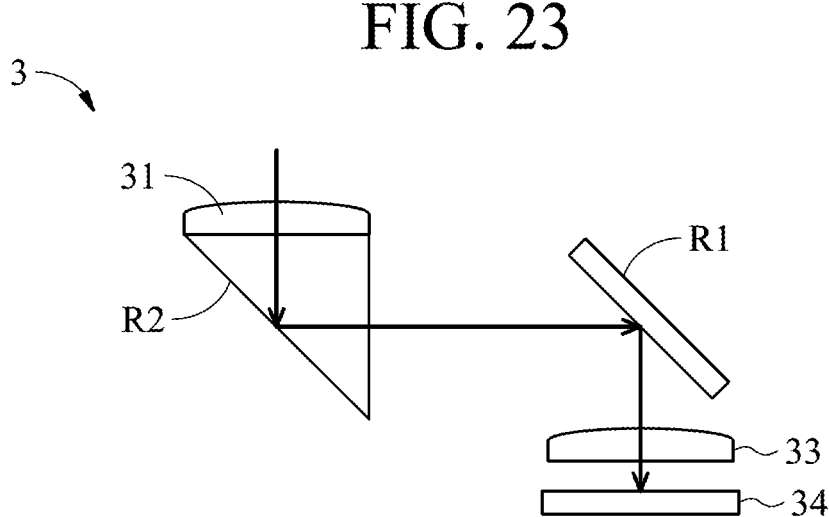
FIG. 24 is a perspective diagram showing the optical lens 31 of the image capturing module 3 attached to a surface of the reflecting element R2.

In some embodiments, as shown in FIGS. 22-24, two reflecting elements R1 and R2 may be provided in the light-emitting module 1 (FIG. 22), the light-receiving module 2 (FIG. 23), or the image capturing module 3 (FIG. 24), so as to reduce the size of the distance measuring device in the vertical direction, wherein the reflecting element R2 comprises a prism. As shown in FIG. 22, the light grating element 11 is attached to a surface of the reflecting element R2. Light emitted from the light source 19 can be sequentially reflected by the reflecting elements R1 and R2 and propagate upwardly through the light grating element 11.

As shown in FIG. 23, the optical lens 21 of the light-receiving module 2 may be attached to a surface of the reflecting element R2. After the measuring light is reflected by the object 5, it propagates through the optical lens 21 and is sequentially reflected by the reflecting elements R2 and R1. Subsequently, light can propagate through the light filter 23 to the image sensor 24.

Similarly, as shown in FIG. 24, the optical lens 31 of the image capturing module 3 may be attached to a surface of the reflecting element R2. After the measuring light is reflected by the object 5, it propagates through the optical lens 31 and is sequentially reflected by the reflecting elements R2 and R1. Subsequently, light can propagate through the light filter 33 to the image sensor 34.

Although some embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, compositions of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. Moreover, the scope of the appended claims should be accorded the broadest interpretation so as to encompass all such modifications and similar arrangements.

While the invention has been described by way of example and in terms of preferred embodiment, it should be understood that the invention is not limited thereto. On the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. A distance measuring device for measuring a distance to an object, comprising:
    a light-emitting module, having a housing, a light source disposed in the housing, a light grating element, and an optical path adjuster, wherein the light source emits a measuring light sequentially through the optical path adjuster and the light grating element along a first axis, and the light grating element, the optical path adjuster, and the light source are sequentially arranged along the first axis, wherein the house at least partially overlaps the light grating element when viewed along the first axis;
    a driving assembly, disposed in the light-emitting module to drive the optical path adjuster or the light grating element to move relative to the housing; and
    a light-receiving module, receiving the measuring light which is reflected by the object to obtain distance information of the object.

2. The distance measuring device as claimed in claim 1, wherein the driving assembly drives the optical path adjuster to move relative to the housing along the first axis.

3. The distance measuring device as claimed in claim 1, wherein the driving assembly drives the optical path adjuster to move relative to the housing along a second axis perpendicular to the first axis.

4. The distance measuring device as claimed in claim 1, wherein the driving assembly drives the optical path adjuster to rotate relative to the housing around a rotary axis which is perpendicular to the first axis.

5. The distance measuring device as claimed in claim 1, wherein the optical path adjuster comprises a collimating lens or a beam expander.

6. The distance measuring device as claimed in claim 1, wherein the light grating element comprises a Fresnel lens.

7. The distance measuring device as claimed in claim 1, further comprising an image capturing module disposed between the light-emitting module and the light-receiving module to capture a color image of the object.

8. The distance measuring device as claimed in claim 1, wherein the light-receiving module has an image sensor having a plurality of photosensitive units arranged in a matrix, and each of the photosensitive units has a first sensing element and a plurality of second sensing elements, wherein the first sensing element receives the measuring light which is reflected by the object, and the second sensing elements receive a visible light which is reflected by the object.

9. The distance measuring device as claimed in claim 8, wherein each of the photosensitive units has a first sensing element and three sensing elements arranged in a matrix.

10. The distance measuring device as claimed in claim 9, wherein the light-receiving module has a light filter having a plurality of light filtering units arranged in a matrix, and each of the light filtering units has an infrared-pass filtering portion and an infrared-cut filtering portion, corresponding to the first and second sensing elements.

11. The distance measuring device as claimed in claim 1, wherein the light source has a plurality of light-emitting units arranged in a matrix, and each of the light-emitting units has a first light-emitting element and a plurality of second light-emitting elements, wherein the first light-emitting element emits the measuring light, and the second light-emitting elements emit visible light.

12. The distance measuring device as claimed in claim 11, wherein the first and second light-emitting elements are arranged in a matrix.

13. The distance measuring device as claimed in claim 1, wherein the measuring light comprises infrared light.

14. The distance measuring device as claimed in claim 1, further comprising a control unit, wherein the light-receiving module transfers the measuring light reflected by the object into an electrical signal, and the control unit transmits a driving signal to the driving assembly according to the electrical signal for moving the light grating element or the optical path adjuster relative to the housing.

15. The distance measuring device as claimed in claim 1, wherein when an intensity of the measuring light received by the light-receiving module is less than a predetermined value, the driving assembly drives the light grating element or the optical path adjuster to move relative to the housing along the first axis.

16. The distance measuring device as claimed in claim 1, wherein when the object is outside of a measuring range of the measuring light, the driving assembly drives the light grating element or the optical path adjuster to move along a second axis or rotate around a rotary axis relative to the housing, wherein the second axis is perpendicular to the first axis.

17. The distance measuring device as claimed in claim 1, further comprising an image capturing module and an image processing module, wherein the light-receiving module generates a non-color image after receiving the measuring light reflected by the object, and the image capturing module captures a color image of the object, wherein the image processing module combines the color image with the non-color image to generate a 3D composite image.

18. The distance measuring device as claimed in claim 1, wherein the light-emitting module further has two reflecting elements disposed in the housing to reflect the measuring light.

19. The distance measuring device as claimed in claim 18, wherein the light-emitting module has two light sources and two optical path adjusters, the two light sources respectively emit infrared light and visible light through the optical path adjusters and the light grating element.

20. The distance measuring device as claimed in claim 18, wherein the light grating element is attached to a surface of one of the reflecting elements.

\* \* \* \* \*